(12) United States Patent
Nejad et al.

(10) Patent No.: US 12,319,779 B2
(45) Date of Patent: Jun. 3, 2025

(54) LIGNIN-BASED POLYURETHANE PREPOLYMERS, POLYMERS, RELATED COMPOSITIONS, AND RELATED METHODS

(71) Applicant: BOARD OF TRUSTEES OF MICHIGAN STATE UNIVERSITY, East Lansing, MI (US)

(72) Inventors: Mojgan Nejad, Okemos, MI (US); Saeid Nikafshar, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 836 days.

(21) Appl. No.: 17/251,055

(22) PCT Filed: Jun. 14, 2019

(86) PCT No.: PCT/US2019/037141
§ 371 (c)(1),
(2) Date: Dec. 10, 2020

(87) PCT Pub. No.: WO2019/241607
PCT Pub. Date: Dec. 19, 2019

(65) Prior Publication Data
US 2022/0064363 A1    Mar. 3, 2022

Related U.S. Application Data (60) Provisional application No. 62/684,947, filed on Jun. 14, 2018.

(51) Int. Cl.
*C08G 18/64* (2006.01)
*B32B 7/12* (2006.01)
(Continued)

(52) U.S. Cl.
CPC .......... *C08G 18/6492* (2013.01); *B32B 7/12* (2013.01); *C08G 18/10* (2013.01);
(Continued)

(58) Field of Classification Search
None
See application file for complete search history.

(56) References Cited

U.S. PATENT DOCUMENTS 4,317,752 A * 3/1982 Blount ............ C08H 8/00
527/400
9,593,221 B1 3/2017 Kurple
(Continued)

FOREIGN PATENT DOCUMENTS

WO WO-2015/021541 A1 2/2015
WO WO-2017/127224 A1 7/2017

OTHER PUBLICATIONS

Alinejad M. et al., "Lignin-Based Polyurethanes: Opportunities for Bio-Based Foams, Elastomers, Coatings and Adhesives", *Polymers*, 11:1-21 (2019).
(Continued)

*Primary Examiner* — Jeffrey D Washville
(74) *Attorney, Agent, or Firm* — MARSHALL, GERSTEIN & BORUN LLP (57) ABSTRACT

The disclosure relates to a polyurethane prepolymer and corresponding crosslinked network polymer incorporating lignin as a natural polyol in the polyurethane system. The polyurethane prepolymer includes a reaction product between an isocyanate, lignin, and a cyclic alkyl carbonate. The reaction product includes (i) free isocyanate groups and/or free hydroxyl groups, (ii) urethane linking groups between residues of lignin aliphatic hydroxyl groups and the isocyanate, (iii) ester linking groups between residues of lignin aromatic hydroxyl groups and a ring-opened form of
(Continued)

the cyclic alkyl carbonate, and (iv) optionally urethane linking groups between residues of the ring-opened cyclic alkyl carbonate and the isocyanate. The polyurethane polymer can be a networked, crosslinked polymerization product of the prepolymer reaction product, for example in combination with a lignin curing agent. The polyurethane polymer can be used as a coating on a substrate, an adhesive joining multiple substrates, etc.

33 Claims, 2 Drawing Sheets (51) Int. Cl.
  C08G 18/10    (2006.01)
  C08G 18/76    (2006.01)
  C09J 11/06    (2006.01)
  C09J 175/04   (2006.01)
(52) U.S. Cl.
  CPC .......... *C08G 18/7671* (2013.01); *C09J 11/06* (2013.01); *C09J 175/04* (2013.01)

(56) References Cited

U.S. PATENT DOCUMENTS

2009/0247722 A1* 10/2009 Zhou .................. C08G 18/48
  528/69
2011/0230580 A1* 9/2011 Allen .................. C08G 64/34
  528/405

OTHER PUBLICATIONS

Duong Le Dai. et al., "High Molecular-Weight Thermoplastic Polymerization of Kraft Lignin Macromers with Diisocyanate", *BioResources*, 9:2359-71 (2014).
Kuhnel I. et al., "Oxyalkylation of Lignin with Propylene Carbonate: Influence of Reaction Parameters on the Ensuing Bio-Based Polyols", *Industrial Crops and Products*, 101:75-83 (2017).
Tavares L.B. et al., "Bio-Based Polyurethane Prepared from Kraft Lignin and Modified Castor Oil", *eXPRESS Polymer Letters*, 10(11):927-40 (2016).
International Application No. PCT/US2019/037141, International Search Report and Written Opinion, mailed Sep. 17, 2019.
Kalami S. et al, "Replacing 100% of phenol in phenolic adhesive formulations with lignin," *Journal of Applied Polymer Science*, 45124 (2017).
Kalami S. et al, "Comparative analysis of different lignins as phenol replacement in phenolic adhesive formulations," *Industrial Crops and Products*, 125:520-528 (2018).
Kühnel et al., A new environmentally friendly approach to lignin-based cyclic carbonates, Macromolecular Chem. Phys., 219:1-6 (2018).
European Patent Application No. 19819805.3, Extended European Search Report, dated Mar. 3, 2022.

* cited by examiner

LIGNIN-BASED POLYURETHANE PREPOLYMERS, POLYMERS, RELATED COMPOSITIONS, AND RELATED METHODS

CROSS-REFERENCE TO RELATED APPLICATIONS

This is a National Stage of International Application No. PCT/US2019/037141, filed Jun. 14, 2019, which claims the benefit of U.S. Provisional Application No. 62/684,947 (filed Jun. 14, 2018), which are incorporated herein by reference in their entireties.

STATEMENT OF GOVERNMENT INTEREST

None.

FIELD OF THE DISCLOSURE

The disclosure relates to a polyurethane prepolymer and corresponding crosslinked network polymer incorporating lignin as a natural polyol in the polyurethane system. The polyurethane prepolymer can include a reaction product between an isocyanate, lignin, and a cyclic alkyl carbonate. The reaction product includes either terminating free isocyanate groups and/or terminating free hydroxyl groups for subsequent curing. The isocyanate-terminated polyurethane prepolymer can be cured with lignin. The polyurethane polymer can be used as a resin for a coating, an adhesive joining multiple substrates, etc.

BACKGROUND OF THE DISCLOSURE

Lignin is a natural polymer containing both aliphatic and aromatic hydroxyl groups. There are two main challenges, however, in using lignin as a polyol in polyurethane formulations: 1) the 3D structure of lignin restricts the accessibility of its hydroxyl groups for reactions with isocyanate, and 2) lignin has low solubility in most common solvents. There are some solvents, like tetrahydrofuran (THF), in which some lignins are soluble, but THF is toxic and volatile.

SUMMARY

The disclosure relates to lignin-based polyurethane (PU) formulations, including both polyurethane prepolymers and corresponding cured/crosslinked network polyurethane polymers (e.g., as thermoset composition).

The disclosed compositions and methods address the foregoing problems using a cyclic alkyl carbonate as a solvent and co-reactant to formulate a zero-VOC lignin-based PU resin that can be used in many applications, including adhesives, coatings, elastomers and foams. Different prepolymers with varying isocyanate (NCO) content can be synthesized using this method that provide the potential to use lignin-based prepolymer for various applications. As illustrated in the examples below, prepolymers suitable for various PU systems (e.g., adhesives, coatings, elastomers and foams) were successfully synthesized. The example isocyanate-terminated prepolymers were variously cured with lignin (e.g., 2K system with lignin as the cross-linker), and polyol-terminated prepolymers (i.e., with higher lignin content) can be cured with mixing with an isocyanate before application (e.g., 2K system with different OH—), or one component formulation (e.g., 1K system that can be cured upon exposure to air and/or moisture, for example). The corresponding cured, crosslinked network PU polymers could be used for PU coatings, elastomers, adhesives, foams, etc. with replacement of conventional polyols with lignin as the PU polyol component. In a particular embodiment, the PU polymers can be used as a coating on a substrate, for example a wood product.

The compositions according to the disclosure have several advantages over conventional polyurethane compositions, including both PU prepolymers and corresponding cured PU polymers. For example, lignin as a sustainable and natural polymer can be used as a polyol component for one or both of PU prepolymer formation and PU prepolymer curing, for example replacing some or all of conventional petroleum-based polyols. The lignin-based PU prepolymer can be used in different applications such as adhesives, coatings, elastomers, and foams. A stable prepolymer is formed with significantly lower free isocyanate content than typical commercial formulations, which in turn correlates to a longer useful shelf life of the prepolymer prior to application. The PU formulations can use lignin that is produced as byproducts during pulping or bioethanol processes without any further modification. The lignin-based PU compositions have comparable chemical and mechanical properties as compared to petroleum-based PU compositions. The PU formulations can be cured at room temperature or at higher temperature if needed. The PU formulations for forming prepolymers and corresponding cured polymers suitably does not have or otherwise require any volatile organic compounds (VOCs), whether as solvents or otherwise. The lignin-based prepolymer compositions have adjustable viscosity and reactivity for different applications. The cured PU polymer compositions exhibit excellent water resistance and adhesion to substrates such as wood.

In one aspect, the disclosure relates to a polyurethane prepolymer comprising: a reaction product between an isocyanate (e.g., a diisocyanate or other poly-functional isocyanate), a lignin comprising aliphatic hydroxyl groups and aromatic hydroxyl groups, and a cyclic alkyl carbonate; wherein: the reaction product comprises at least one of free isocyanate groups and free hydroxyl groups; the reaction product comprises urethane linking groups between residues of the lignin aliphatic hydroxyl groups and the isocyanate; and the reaction product comprises ester linking groups between residues of the lignin aromatic hydroxyl groups and a ring-opened cyclic alkyl carbonate. Optionally, the reaction product further comprises urethane linking groups between residues of the ring-opened cyclic alkyl carbonate and the isocyanate.

Various refinements of the polyurethane prepolymer and its corresponding reaction product are possible.

In a refinement, the isocyanate comprises a diisocyanate such as methylene diphenyl diisocyanate (MDI), tolylene diisocyanate (TDI), hexamethylene diisocyanate (HDI), polymeric methylene diphenyl diisocyanate (pMDI), etc.

In a refinement, the lignin is derived from a biomass selected from the group consisting of hardwoods, softwoods, grasses (e.g., agricultural residues), and combinations thereof.

In a refinement, the lignin is isolated from an extraction process selected from the group consisting of Kraft extraction, soda extraction, organosolv extraction, enzymatic hydrolysis extraction, ionic liquid extraction, variations thereof and combinations thereof. In various embodiments, the lignin, prior to incorporation into the reaction product, suitably has some or all of the following properties: a molecular weight in a range of 1000 to 20000 or 3000 to 5000; a polydispersity in a range of 1.5 to 5 or 2 to 4; an aliphatic hydroxyl content in a range of 1 to 4 mmol/g or 1 to 3 mmol/g; a phenol hydroxyl content in a range of 2 to 5 mmol/g or 3 to 5 mmol/g; and a total hydroxyl content in a range of 3 to 8 mmol/g or 4 to 7 mmol/g.

In a refinement, the cyclic alkyl carbonate has an alkyl group containing from 2 to 20 carbon atoms (e.g., at least 2, 3, 4, 5, or 6 and/or up to 3, 4, 5, 6, 8, 10, 12, 15, or 20 carbon atoms).

In a refinement, the cyclic alkyl carbonate has a structure according to Formula I:

wherein: n is 1 to 10 (e.g., 1, 2, or 3, for example at least 1, 2, or 3 and/or up to 2, 4, 6, 8, or 10); i is each of 1 to n; and $R_i$, $R'_i$, $R_{n+1}$, and $R'_{n+1}$ are independently selected from the group consisting of H and linear or branched, substituted or unsubstituted $C_1$-$C_{10}$ alkyl groups (e.g., alkyl groups with 1, 2, or 3 carbons, for example at least 1, 2, or 3 and/or up to 2, 4, 6, 8, or 10 carbons). In the illustrated structure, the index "i" takes all of the values from 1 to n for a given value of n (i.e., there are "i" groups for each of the n+1 total carbons in the ring). In a particular refinement, n is 1; $R_1$, $R'_1$, and $R'_2$ are H; and $R_2$ is $CH_3$ (i.e., propylene carbonate). In another particular refinement, n is 1; and $R_1$, $R'_1$, $R_2$, and $R'_2$ are H (i.e., ethylene carbonate). In another particular refinement, n is 2; and $R_1$, $R'_1$, $R_2$, $R'_2$, $R_3$, and $R'_3$ are H (i.e., trimethylene carbonate).

In a refinement, the reaction product comprises free isocyanate groups (e.g., and substantially no free hydroxyl groups). For example, the reaction product can have a free isocyanate group content in a range from 1 wt. % to 30 wt. % (e.g., 6 wt. % to 10 wt. %) based on weight of free isocyanate groups relative to weight of prepolymer, such as at least 1, 2, 3, 4, 5, 6, 8, or 10 wt. % and/or up to 8, 10, 12, 15, 20, 25, or 30 wt. %.

In a refinement, the reaction product comprises free hydroxyl groups (e.g., and substantially no free isocyanate groups). For example, the reaction product can have a free hydroxyl group content in a range from 1 wt. % to 40 wt. % based on weight of free hydroxyl groups relative to weight of prepolymer such as at least 1, 2, 3, 4, 5, 6, 8, 10 or 15 wt. % and/or up to 8, 10, 12, 15, 20, 25, 30, 35, or 40 wt. %.

In a refinement, the reaction product comprises free isocyanate groups and free hydroxyl groups. For example, the reaction product can have a free isocyanate group content in a range from 1 wt. % to 30 wt. % based on weight of free isocyanate groups relative to weight of prepolymer (e.g., further including any of the sub-ranges noted above); and the reaction product can have a free hydroxyl group content in a range from 1 wt. % to 40 wt. % based on weight of free hydroxyl groups relative to weight of prepolymer (e.g., further including any of the sub-ranges noted above).

In a refinement, the reaction product (e.g., and prepolymer) is free from polyol residues other than the lignin and the ring-opened cyclic alkyl carbonate.

In a refinement, the reaction product has an isocyanate content in a range from 1 wt. % to 30 wt. % based on weight of isocyanate relative to weight of prepolymer; the reaction product has a lignin content in a range from 1 wt. % to 50 wt. % based on weight of lignin relative to weight of prepolymer; and the reaction product has a cyclic alkyl carbonate content in a range from 10 wt. % to 80 wt. % based on weight of cyclic alkyl carbonate relative to weight of prepolymer. For example, the reaction product can have an isocyanate content of at least 1, 2, 3, 4, 5, 6, 8, or 10 wt. % and/or up to 8, 10, 12, 15, 20, 25, or 30 wt. %, based on weight of isocyanate relative to weight of prepolymer. Similarly, the reaction product can have a lignin content of at least 1, 2, 3, 4, 5, 8, 10, 15, 20, 25, or 30 wt. % and/or up to 8, 10, 15, 20, 25, 30, 40, or 50 wt. %, based on weight of lignin relative to weight of prepolymer. Similarly, the reaction product can have a cyclic alkyl carbonate content of at least 10, 20, 30, 40, or 50 wt. % and/or up to 30, 40, 50, 60, 70, or 80 wt. %, based on weight of cyclic alkyl carbonate relative to weight of prepolymer.

In another aspect, the disclosure relates to a prepolymer mixture comprising: a cyclic alkyl carbonate medium; and the reaction product (e.g., polyurethane prepolymer) according to any of the variously disclosed embodiments and refinements in the cyclic alkyl carbonate medium. In some embodiments, the prepolymer mixture can further include one or more of an adhesion promoter, a curing catalyst, and a chain extender (e.g., to facilitate substrate adhesion and/or the polymerization process upon eventual curing).

Various refinements of the prepolymer mixture are possible.

In a refinement, the reaction product is present in the prepolymer mixture in an amount ranging from 10 wt. % to 50 wt. % based on the combined weight of the cyclic alkyl carbonate medium and the reaction product (e.g., prepolymer). For example, the reaction product can be present in an amount of at least 10, 15, 20, 25, or 30 wt. % and/or up to 25, 30, 35, 40, 45, or 50 wt. %, based on the combined weight of the cyclic alkyl carbonate medium and the reaction product or prepolymer. Similarly, the cyclic alkyl carbonate medium can be present in an amount of at least 50, 55, 60, 65, or 70 wt. % and/or up to 65, 70, 75, 80, 85, or 90 wt. %, based on the combined weight of the cyclic alkyl carbonate medium and the reaction product or prepolymer.

In a refinement, the reaction product is in solution in the cyclic alkyl carbonate medium (e.g., dissolved in the medium).

In a refinement, the prepolymer mixture further comprises water; the reaction product is in solution in the cyclic alkyl carbonate medium; and the cyclic alkyl carbonate medium with the reaction product dissolved therein is dispersed throughout the water (e.g., an aqueous dispersion or emulsion in water).

In another aspect, the disclosure relates to a polyurethane polymer comprising: a networked, crosslinked polymerization product of (i) the reaction product (e.g., polyurethane prepolymer) according to any of the variously disclosed embodiments and refinements or (ii) the prepolymer mixture according to any of the variously disclosed embodiments and refinements. The polyurethane polymer is generally a thermoset polymer formed after sufficient curing time of the polyurethane prepolymer.

Various refinements of the polyurethane polymer are possible.

In a refinement, the reaction product comprises free isocyanate groups (e.g., and substantially no free hydroxyl groups); and the polyurethane polymer is a networked, crosslinked polymerization product between the reaction product (e.g., polyurethane prepolymer) and further lignin.

In a refinement, the reaction product comprises hydroxyl groups (e.g., and substantially no isocyanate hydroxyl groups); and the polyurethane polymer is a networked, crosslinked polymerization product between the reaction product (e.g., polyurethane prepolymer) and further isocyanate.

In a refinement, the reaction product comprises free isocyanate groups and free hydroxyl groups; and the polyurethane polymer is a networked, crosslinked polymerization product between the reaction product (e.g., polyurethane prepolymer) itself (e.g., as a 1K formulation).

In a refinement, the polyurethane polymer further comprises one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

In another aspect, the disclosure relates to an article (e.g., a coated article) comprising: (a) a substrate; and (b) a polyurethane polymer according to any of the variously disclosed embodiments and refinements coated on a surface of the substrate.

Various refinements of the article are possible.

In a refinement, the substrate is selected from the group of metal, plastics, a different thermoset material, glass, wood, fabric (or textile), composites, and ceramics.

In a refinement, the polyurethane polymer has a thickness ranging from 0.01 μm to 500 μm.

In a refinement, the article further comprises an additional substrate, wherein: the polyurethane polymer is also coated on a surface of the additional substrate, and the polyurethane polymer joins the substrate and the additional substrate together (e.g., as an adhesive), for example contributing to the structure of foams and elastomers.

While the disclosed compositions, systems, processes, and articles are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein:

FIG. 3 includes FTIR spectra for (A) lignin prior to any reaction ("lignin"), (B) PU prepolymer formed from PC, MDI, and lignin ("Prepolymer MDI lignin"), and (C) crosslinked PU polymer cured with lignin ("PU100% lignin).

DETAILED DESCRIPTION

The disclosure relates to a polyurethane prepolymer and corresponding crosslinked network polymer incorporating lignin as a natural polyol in the polyurethane system. Lignin from any of a variety of sources includes both aliphatic hydroxyl groups and aromatic hydroxyl groups. The polyurethane prepolymer includes a reaction product between an isocyanate (e.g., a diisocyanate or other poly-functional isocyanate), lignin, and a cyclic alkyl carbonate. The reaction product includes (i) free isocyanate groups and/or free hydroxyl groups (i.e., for subsequent curing), (ii) urethane linking groups between residues of the lignin aliphatic hydroxyl groups and the isocyanate, (iii) ester linking groups between residues of the lignin aromatic hydroxyl groups and a ring-opened form of the cyclic alkyl carbonate, and (iv) optionally urethane linking groups between residues of the ring-opened cyclic alkyl carbonate and the isocyanate. In some embodiments, the polyurethane prepolymer is present in the form of a prepolymer mixture including the prepolymer reaction product in a liquid medium of cyclic alkyl carbonate (e.g., the same or different carbonate from that in the prepolymer). The polyurethane polymer can be a networked, crosslinked polymerization product of the prepolymer reaction product, for example in combination with lignin to obtain fully cured system. The polyurethane polymer can be used as a coating on a substrate, an adhesive joining multiple substrates, in foam and elastomer formulations, etc.

A lignin-based polyurethane resin as described herein replaces petroleum-based polyol with lignin in a polyurethane formulation that can be cured either at room temperature or higher temperature. The resin can be prepared using a wide range of lignins from different resources (hardwood, softwood or annual crops) and isolated from different processes (Kraft, organosolv, soda or enzymatic hydrolysis) at atmospheric pressure without any need for further modification. A prepolymer is obtained from the reaction between isocyanate (e.g., TDI or MDI) and lignin that are dissolved in a cyclic alkyl carbonate, which serves both as a solvent and a reactant that reacts with lignin and isocyanate to form the prepolymer (e.g., formulation part A). In a following step, lignin can also be used as a polyol (e.g., formulation part B) which is added to the prepolymer to fully cure and form a cross-linked network polyurethane system, for example when the polyurethane prepolymer is NCO-terminated. This is a zero-VOC formulation with a stable prepolymer. In the disclosed compositions, the polyol in a polyurethane formulation is replaced with lignin (i.e., a natural sustainable polymer) in a urethane reaction without further modification. The formulated resin (prepolymer) can be used for different applications such as in PU-based adhesives, coatings, elastomers, and foams.

The isocyanate is not particularly limited and generally can include any aromatic, alicyclic, and/or aliphatic monomeric, oligomeric, and/or polymeric isocyanates having at least two reactive isocyanate groups (—NCO) (e.g., di- or higher poly-functional isocyanates). Suitable isocyanates contain on average 2-4 isocyanate groups. In some embodiments, the isocyanate includes a diisocyanate. In some embodiments, the isocyanate includes triisocyanate. Suitable diisocyanates can have the general structure (O=C=N)—R—(N=C=O), where R can include aromatic, alicyclic, and/or aliphatic groups, for example having at least 2, 4, 6, 8, 10 or 12 and/or up to 8, 12, 16, or 20 carbon atoms. Examples of specific isocyanates include 1,5-naphthylene diisocyanate, 4,4'-diphenylmethane diisocyanate (MDI), hydrogenated MDI, polymeric methylene diphenyl diisocyanate (pMDI), xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diiso-cyanate, 1,3-phenylene diisocyanate, 1,4-phenylene diisocyanate, one or more isomers of tolylene diisocyanate (TDI, such as toluene 2,4-diisocyanate), 1-methyl-2,4-diiso-cyanatocyclohexane, 1,6-diiso- cyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof. The isocyanate can be biobased or made of synthetic feedstock. Examples of suitable biobased isocyanates include pentamethylene diisocyanate trimer, and isocyanates formed from base compounds to which isocyanate groups are attached (e.g., via suitable derivatization techniques), including isocyanate-terminated poly(lactic acid) having two or more isocyanate groups, isocyanate-terminated poly(hydroxyalkanaotes) having two or more isocyanate groups, isocyanate-terminated biobased polyesters having two or more isocyanate groups.

The lignin is not particularly limited and generally can include lignin from any lignocellulosic biomass. Plants, in general, are comprised of cellulose, hemicellulose, lignin, extractives, and ash. Lignin typically constitutes 15-35 wt. % of woody plant cell walls, is an amorphous aromatic polymer made of phenylpropane units (e.g., coniferyl alcohol, sinapyl alcohol, p-coumaryl alcohol). The lignin for use according to the disclosure is not particularly limited to the source of lignin or its isolation method. Any type of lignin regardless of the biomass type (hardwood, softwood and grasses) isolated through any extraction methods (such as Kraft, soda, organosolv, enzymatic liquid and Ionic liquid) is suitable for use in the disclosed compositions and articles.

The cyclic alkyl carbonate is not particularly limited and generally can include any cyclic structure including a carbonate group (—OC(=O)O—) linked to an alkyl hydrocarbon group at both carbonate oxygen atoms, thus forming a cyclic structure from five or more atoms (e.g., one carbonyl carbon atom, two carbonate oxygen atoms, and at least two alkyl carbon atoms). The cyclic alkyl carbonate suitably is in liquid form both at lower ambient temperatures (e.g., room temperature or about 20-30° C.) and/or at higher temperatures that may be useful reaction temperatures for prepolymerization and/or curing. For example, propylene carbonate has a melting point of −49° C. and a boiling point of 242° C. Similarly, ethylene carbonate has a melting point of 35° C. and a boiling point of 243° C., so it would be useful, for example, in a high-temperature formulation (i.e., where it is in liquid form) or in liquid solution with another cyclic alkyl carbonate that is liquid at lower ambient temperatures, such as propylene carbonate. The cyclic alkyl carbonate further suitably serves as a solvent for the lignin and/or the isocyanate, thus providing a reaction medium as well as a co-reactant for prepolymerization and/or curing.

In an embodiment, the cyclic alkyl carbonate has an alkyl group containing from 2 to 20 carbon atoms, for example at least 2, 3, 4, 5, or 6 and/or up to 3, 4, 5, 6, 8, 10, 12, 15, or 20 carbon atoms. The alkyl group can be linear or branched and/or substituted or unsubstituted. The alkyl group and the corresponding cyclic alkyl carbonate preferably does not include any free hydroxyl groups, free amine groups, and/or free carboxylic acid/carboxylate groups (e.g., when the alkyl group is a substituted group). The alkyl group does not include the carbon atom in the carbonyl group of the carbonate. Thus, the cyclic alkyl carbonate has 3 to 21 total carbon atoms in this embodiment. The alkyl group can be linked to the carbonate group oxygen atoms at adjacent carbon atoms (e.g., as in propylene carbonate with a 3-carbon alkyl group or ethylene carbonate with a 2-carbon alkyl group) or at non-adjacent carbon atoms (e.g., as in trimethylene carbonate with a 3-carbon alkyl group).

In a refinement, the cyclic alkyl carbonate has a structure according to Formula I:

Formula I

In the illustrated Formula I, the index n takes a single value from 1 to 10, such as 1, 2, or 3, for example at least 1, 2, or 3 and/or up to 2, 4, 6, 8, or 10. The index i takes all of the values from 1 to n for a given value of n (i.e., there are "i" groups for each of the n+1 total carbons in the ring). $R_i$, $R'_i$, $R_{n+1}$, and $R'_{n+1}$ can independently be H or linear or branched, substituted or unsubstituted $C_1$-$C_{10}$ alkyl groups, such as alkyl groups with 1, 2, or 3 carbons, for example at least 1, 2, or 3 and/or up to 2, 4, 6, 8, or 10 carbons. Substituents for substituted alkyl groups are generally not limited, but preferably do not include isocyanate-reactive groups such as hydroxyl groups, amine groups (e.g., primary, secondary), and carboxylic acid/carboxylate groups. For example, if n=2, then the structure of Formula I will have $R_1$, $R'_1$, $R_2$, $R'_2$, $R_3$, and $R'_3$ substituents, which can be independently selected to be hydrogen atoms or the alkyl groups noted above.

Examples of suitable cyclic alkyl carbonates include propylene carbonate, ethylene carbonate, trimethylene carbonate, butylene carbonates (e.g., derived from one or more butanediols such as 1,2-, 1,3-, 1,4-, or 2,3-butanediol), pentylene carbonates (e.g., derived from one or more pentanediols), etc. In the context of the structure of Formula I for propylene carbonate, n is 1; $R_1$, $R'_1$, and $R'_2$ are H; and $R_2$ is $CH_3$. For ethylene carbonate, n is 1; and $R_1$, $R'_1$, $R_2$, and $R'_2$ are H. For trimethylene carbonate, n is 2; and $R_1$, $R'_1$, $R_2$, $R'_2$, $R_3$, and $R'_3$ are H.

As described above, the prepolymer reaction product includes at least some free isocyanate groups and/or free hydroxyl groups for subsequent curing to form the final polymer. In an embodiment, the reaction product includes free isocyanate groups (e.g., and substantially no free hydroxyl groups), for example as a result of adding a desired stoichiometric excess of the isocyanate to the prepolymer reaction medium. For example, the reaction product can have a free isocyanate group content in a range from 1 wt. % to 30 wt. % (e.g., 6 wt. % to 10 wt. %) based on weight of free isocyanate groups relative to weight of prepolymer.

In another embodiment, the reaction product includes free hydroxyl groups (e.g., and substantially no free isocyanate groups), for example as a result of adding a desired stoichiometric excess of the lignin to the prepolymer reaction medium. Excess lignin can provide free hydroxyl groups in one or more forms, such as (i) unreacted aliphatic hydroxyl groups in the lignin, (ii) unreacted aromatic hydroxyl groups in the lignin, and (iii) unreacted aliphatic hydroxyl groups resulting from ring-opening/transesterification of the cyclic alkyl carbonate. For example, the reaction product can have a free hydroxyl group content in a range from 1 wt. % to 40 wt. % or 5 wt. % to 35 wt. % based on weight of free hydroxyl groups relative to weight of prepolymer.

In an embodiment, the reaction product includes both free isocyanate groups and free hydroxyl groups, for example to provide a self-curing prepolymer reaction product. For example, the reaction product can have a free isocyanate group content in a range from 1 wt. % to 30 wt. % or 5 wt. % to 30 wt. % based on weight of free isocyanate groups relative to weight of prepolymer; and the reaction product can have a free hydroxyl group content in a range from 1 wt. % to 40 wt. % 5 wt. % to 40 wt. % based on weight of free hydroxyl groups relative to weight of prepolymer.

Several reactions can take place and several types of linking groups can be formed when the isocyanate, the lignin, and the cyclic alkyl carbonate react to form the polyurethane prepolymer as the corresponding prepolymer. In general, an isocyanate group (—NCO) and a hydroxyl group (—OH) can react to form a corresponding urethane or carbamate group (—NC(=O)O—) linking the other constituents containing the reacted isocyanate and hydroxyl groups. In the context of the present disclosure, the aliphatic hydroxyl groups are more reactive as compared to aromatic hydroxyl groups towards isocyanate groups. Thus, the isocyanate groups of the isocyanate preferentially react with the aliphatic hydroxyl groups of the lignin, but there is relatively little (if any) reaction with the aromatic hydroxyl (or phenolic) groups of the lignin especially at room temperature. In particular, the aromatic hydroxyl groups of lignin are generally less reactive towards an isocyanate due to the lower nucleophile properties for resonance of electrons in an aromatic ring. In contrast, however, the aromatic hydroxyl groups of lignin are reactive towards and can participate in a ring-opening transesterification reaction with cyclic alkyl carbonate. This reaction forms an aromatic ester linking group between the aromatic hydroxyl groups of lignin and the ring-opened cyclic alkyl carbonate. This process is illustrated in Scheme 1 below for a general first lignin residue ($L_1$) having an aromatic hydroxyl group reacting with propylene carbonate as a representative cyclic alkyl carbonate.

Scheme 1. Transesterification of Cyclic Alkyl Carbonate with Lignin Aromatic Hydroxyl Group

As illustrated in Scheme 1, the first transesterification product includes a pendant aliphatic hydroxy group still linked to the carbonate. This aliphatic hydroxy group, similar to the lignin aliphatic hydroxy groups, is relatively more reactive with the isocyanate groups of the isocyanatethan aromatic hydroxyl groups of lignin. Accordingly, the generated pendant aliphatic hydroxy group provides a means to extend the prepolymer chain by via a 1:1 conversion of relatively non-reactive lignin aromatic hydroxy groups to relatively reactive aliphatic hydroxy groups, in terms of their relative reactivity towards an isocyanate group.

In some embodiments, the first transesterification product shown in Scheme 1 can react with further lignin aromatic hydroxyl groups. For example, a general second lignin residue ($L_2$; analogous to the illustrated first lignin residue) having an aromatic hydroxyl group can react with the first transesterification product from Scheme 1, such as when lignin and cyclic alkyl carbonate are pre-reacted in the absence of the isocyanate. This second transesterification reaction can link the two lignin residues ($L_1$ and $L_2$) via the carbonate diester, and it can liberate alkyl polyol, for example propylene glycol in this illustrative case with propylene carbonate as a representative cyclic alkyl carbonate.

The foregoing illustrates synergistic advantages of the disclosed compositions, articles, and methods, including: (i) at least some replacement of petroleum-based polyols with natural (i.e., lignin) polyols, (ii) a means to utilize and incorporate otherwise non-reactable lignin aromatic hydroxyl groups, and (iii) a non-VOC reaction system. The cyclic alkyl carbonate is similarly advantageous for several reasons, because it provides (i) a non-VOC solvent medium for the reaction, (ii) a means to react/link with lignin aromatic hydroxyl groups, and (iii) a means to provide additional reactive aliphatic hydroxyl groups.

As evident from Scheme 1 above, the reaction product can further include urethane linking groups between residues of the ring-opened cyclic alkyl carbonate and the isocyanate. This can represent a single transesterification and ring opening where the alkyl portion of the cyclic alkyl carbonate is still attached to the carbonyl (which has one aromatic ester), having generated one pendant alky hydroxy group for isocyanate reaction, for example as illustrated in Scheme 1. This can also represent a double transesterification and ring opening where the alkyl portion of the cyclic alkyl carbonate has been detached from the carbonyl (which has two aromatic esters), having liberated an alkyl polyol (e.g., propylene glycol from propylene carbonate) with at least two alky hydroxy groups for isocyanate reaction in a separate chain.

As noted above, the illustrative Scheme 1 uses propylene carbonate as a representative cyclic alkyl carbonate, and a double transesterification reaction can yield propylene glycol as an intermediate that can further react with the isocyanate (not shown). When cyclic alkyl carbonates other than propylene carbonate are used, a more general aliphatic polyol according to Formula II below can be formed:

In the illustrated Formula II, the parameters n, i, $R_i$, $R'_i$, $R_{n+1}$, and $R'_{n+1}$ can have the same meaning and values as in Formula I above. The general aliphatic polyol according to Formula II can likewise further react with the isocyanate (not shown) and be incorporated into both the polyurethane prepolymer and eventual crosslinked polyurethane polymer.

As described above, lignin can serve as a polyol replacement in a polyurethane formulation, thus providing a natural polyol that reduces or eliminates the need for the addition of other polyols. Accordingly, in an embodiment, the prepolymer reaction product is free from polyol residues other than the lignin and the ring-opened cyclic alkyl carbonate. The reaction product, prepolymer, and reaction mixture used to make the same are generally free from added polyols and corresponding polyol reaction residues, in particular those derived from petroleum products. For example, the reaction product and prepolymer contain only polyol residues from (i) lignin/isocyanate reaction, (ii) lignin/carbonate ester reaction, and (iii) not more than a stoichiometric amount of polyol corresponding to the amount of reacted cyclic alkyl carbonate. For example, 1 mol of propylene carbonate that reacts and is incorporated into the prepolymer reaction product generates (i) 1 mol of carbonate groups (—OC(=O)O—) that form one or two aromatic esters with lignin aromatic hydroxy groups and correspondingly one or zero aliphatic esters with its original alkyl group (i.e., depending on whether it was singly or doubly transesterified) and (ii) 1 mol of propylene glycol with one or two of its hydroxyl groups reacted with isocyanate groups in a urethane link and correspondingly one or zero of its hydroxyl groups still in an ester group with the carbonate. Thus, a prepolymer reaction product incorporating 1 mol of propylene carbonate preferably would (i) not have more than 1 mol of propylene glycol residues and (ii) be free from polyol residues other than propylene glycol and lignin. Example polyols that can be reduced, eliminated, or otherwise avoided in the prepolymer, in particular those derived from petroleum products, include diols, triols, and polyols with two, three, four, or more hydroxyl groups such as glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, and pentaerythritol.

The prepolymer reaction product can incorporate the isocyanate, lignin, and cyclic alkyl carbonate in a wide variety of relative amounts, depending on the monomers used and desired properties of the eventual prepolymer and crosslinked polymer. In an embodiment, the reaction product has a isocyanate content in a range from 1 wt. % to 40 wt. % based on weight of isocyanate relative to weight of prepolymer; the reaction product has a lignin content in a range from 1 wt. % to 50 wt. % based on weight of lignin relative to weight of prepolymer; and/or the reaction product has a cyclic alkyl carbonate content in a range from 10 wt. % to 80 wt. % based on weight of cyclic alkyl carbonate relative to weight of prepolymer. The cyclic alkyl carbonate content includes cyclic alkyl carbonate that has been singly transesterified and still includes the carbonate group linked to the alkyl group. The cyclic alkyl carbonate content also includes cyclic alkyl carbonate that has been doubly transesterified to cleave the carbonate group and the alkyl group, which components are incorporated into the prepolymer by reaction with lignin aromatic hydroxyl groups and isocyanate groups, respectively.

The prepolymer reaction product can be in the form of a liquid prepolymer mixture. The prepolymer mixture includes one or more cyclic alkyl carbonates as a liquid medium and the prepolymer reaction product in the cyclic alkyl carbonate medium. The cyclic alkyl carbonate of the medium can be the same or different as the cyclic alkyl carbonate incorporated into the prepolymer reaction product. Generally, they are the same, as the cyclic alkyl carbonate medium can be excess solvent/reactant that was added to the prepolymer reaction medium and intended to remain as solvent for the prepolymer mixture and (optionally) eventual further reactant upon curing of the prepolymer. The two can be different if desired, for example if further cyclic alkyl carbonate is added to the prepolymer reaction product to form the prepolymer mixture. Similarly, a blend of different cyclic alkyl carbonates can be included in the original prepolymer reaction medium such that one cyclic alkyl carbonate preferentially reacts during prepolymer formation and another has a lower reaction rate such that it substantially remains after prepolymer formation.

In an embodiment, the reaction product is in solution in the cyclic alkyl carbonate medium. For example, the prepolymer reaction product can be dissolved in the medium, such as in excess cyclic alkyl carbonate reactant remaining after prepolymerization.

In an embodiment, the prepolymer mixture further comprises water. For example, the reaction product can be in solution in the cyclic alkyl carbonate medium, while the cyclic alkyl carbonate medium with the reaction product dissolved therein is dispersed throughout the water. This can represent an aqueous dispersion or emulsion in water of the cyclic alkyl carbonate medium, the dispersion or emulsion droplets of which contain the prepolymer dissolved therein. As an alternative, the prepolymer mixture can contain a relatively minor amount of water, for example as blowing agent when the prepolymer mixture is intended to form a foamed polymer composition.

The polyurethane polymer can be a networked, crosslinked polymerization product of (i) the prepolymer reaction product and/or (ii) the prepolymer mixture as described herein. The polyurethane polymer is generally a thermoset polymer formed after sufficient curing time of the polyurethane prepolymer.

In an embodiment, the prepolymer reaction product includes free isocyanate groups (e.g., and substantially no isocyanate-reactive free hydroxyl groups, but possibly containing some less or non-reactive lignin hydroxyl groups such as aromatic hydroxyl groups), and the corresponding polyurethane polymer is a networked, crosslinked polymerization product between the prepolymer reaction product and further lignin. The further lignin likewise contains aliphatic hydroxyl groups and aromatic hydroxyl groups, and it can be the same or different lignin used to form the prepolymer. The aliphatic hydroxyl groups of the additional lignin used for crosslinking react with the free isocyanate groups of the polyurethane prepolymer. The aromatic hydroxyl groups of the additional lignin used for crosslinking can react with cyclic alkyl carbonate, for example when present as a solvent/excess reactant in the prepolymer mixture. The further lignin can be added to the prepolymer at the time of curing (e.g., a 2K formulation). A typical NCO-functional prepolymer can contain, for example, about 10-20 wt. % isocyanate, 50-80 wt. % cyclic alkyl carbonate, and 5-15 wt. % lignin in terms of incorporated monomer components. For subsequent complete curing of an NCO-functional prepolymer, additional lignin can be added to the prepolymer in an amount of about 40-70 wt. % relative to the prepolymer. In some embodiments, the NCO-functional prepolymer can be formulated so that the amount of free isocyanate is selected to react with moisture in the air or with substrate and no lignin or other crosslinking agent is needed (e.g., a 1K formulation).

In an embodiment, the reaction product includes hydroxyl groups (e.g., and substantially no isocyanate hydroxyl groups), and the corresponding polyurethane polymer is a networked, crosslinked polymerization product between the reaction product (e.g., polyurethane prepolymer) and further isocyanate. The further isocyanate can be an isocyanate-functional PU prepolymer, such as the lignin-based PU prepolymer according to any of the various embodiments. Alternatively or additionally, the further isocyanate can be the same or different isocyanate used to form the prepolymer (e.g., MDI, HDI, etc.). The isocyanate groups of the further isocyanate used for crosslinking react with the free hydroxyl groups of the polyurethane prepolymer. The further isocyanate can be added to the prepolymer at the time of curing (e.g., a 2K formulation). A typical OH-functional prepolymer can contain, for example, about 1-5 wt. % isocyanate, 40-70 wt. % cyclic alkyl carbonate, and 30-60 wt. % lignin in terms of incorporated monomer components. For subsequent complete curing of an OH-functional prepolymer, additional isocyanate can be added to the prepolymer in an amount of about 5-8 wt. % relative to the prepolymer, and there is no need to add additional cyclic alkyl carbonate upon curing.

In an embodiment, the reaction product includes both free isocyanate groups and free hydroxyl groups, and the corresponding polyurethane polymer is a networked, crosslinked polymerization product between the prepolymer reaction product itself (e.g., as a 2K formulation).

In an embodiment, the polyurethane polymer can include any suitable organic or inorganic filler or additive, which can be included to improve one or more mechanical properties, optical properties, electrical properties, oil-resistance properties, and water-resistance properties of the final composition. The fillers or additives can be added to the polyurethane prepolymer or prepolymer mixture prior to curing. Examples of suitable fillers or additives include nanoclay, graphene oxide, graphene, silicon dioxide (silica), aluminum oxide, diatomaceous earth, cellulose nanocrystals, carbon nanotubes, titanium dioxide (titania), and combinations or mixtures thereof. In addition, the fillers can include biocides, pigments, dyes, a thermoplastic material, or a combination thereof. The fillers can be collectively or individually included in the range from 0.01 wt. % to 10 wt. %, for example in range from 1 wt. % to 5 wt. %, based on the total weight of the polyurethane polymer (e.g., combined weight of the networked, crosslinked polymerization product and all other additives combined).

Coated Article

Figure 1:
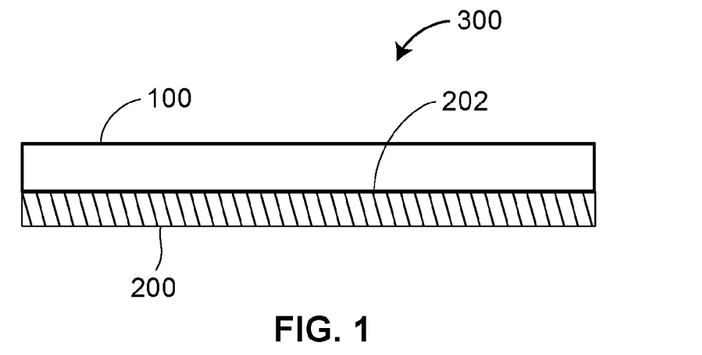
FIG. 1 illustrates an article according to the disclosure in which the polyurethane polymer is a coating on a substrate.
Figure 2:
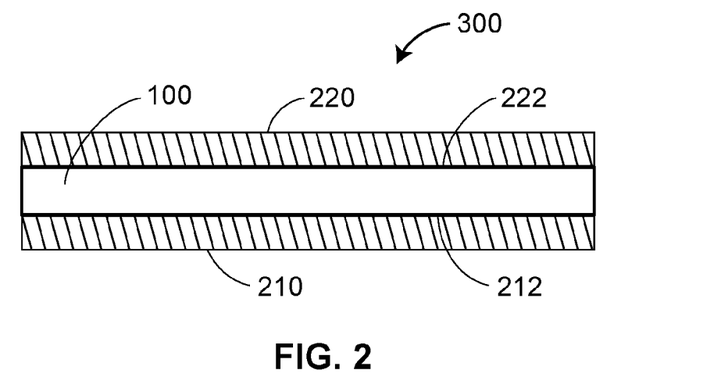
FIG. 2 illustrates an article according to the disclosure in which the polyurethane polymer is an adhesive joining two substrates.

FIG. 1 illustrates an aspect of the disclosure in which an article 300 (e.g., coated article) includes a substrate 200 and the polyurethane polymer 100 coated on a surface 202 of the substrate 200. The PU polymer 100 can be in the form of a coating or film on an external, environment-facing surface 202 of the substrate 200 (e.g., where the surface 202 would otherwise be exposed to the external environment in the absence of the composition 100). In this case, the PU polymer 100 provides protection to the underlying substrate 200 (e.g., one or more of water-resistance, oil-resistance, mechanical strength, etc.). FIG. 2 illustrates an aspect of the disclosure in which an article 310 includes a first substrate 210, a second substrate 220, and the polyurethane polymer 100 coated on internal surfaces 212, 222 of the substrates 210, 220. In this case, the PU polymer 100 can be in the form of an adhesive or bonding coating or film on the internal substrate surfaces, which coating or film joins the opposing substrates 210, 220.

The substrates are not particularly limited, and generally can be formed from any material(s) desired for protection, adhesion, or otherwise with a polyurethane polymer, in particular given the good, broad adhesive capabilities of the polyurethane polymer. For example, the substrate can be a metal, plastic, a different thermoset material (e.g., a primer material; material other than the other than polyurethane polymer), glass, wood, fabric (or textile), or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), polylactic acid (PLA), starch, chitosan, etc. In an embodiment, the substrate can be in the form of a three-dimensionally printed substrate, whether formed from a polymeric/plastic material or otherwise. Suitable wood materials can be any type of wood commonly used in home, office, and outdoor settings. Suitable glass materials can be those used for building windows, automobile windows, etc. In some embodiments, the substrate is a top layer of a coating or series of coatings on a different underlying substrate. For example, the coated article can include a substrate material as generally disclosed herein, one or more intermediate coatings on the substrate (e.g., an epoxy coating, an acrylic coating, another primer coating, etc.), and the polyurethane polymer on the one or more intermediate coatings as the final, external coating on the coated article.

The polyurethane polymer can have any desired thickness on the substrate(s). In common applications, the polyurethane polymer has a thickness ranging from 0.010 μm to 500 μm, for example at least 0.01, 10, 20, 50, or 100 μm and/or up to 200, 500 μm. Typical cast coatings can have thicknesses of 10 μm to 100 μm. Typical spin coatings can have thicknesses of 0.05 μm or 0.10 μm to 0.20 μm or 0.50 μm. Multiple coating layers can be applied to substrate to form even thicker layers of the polyurethane polymer (e.g., above 500 μm or otherwise) if desired.

Methods for Forming Compositions and Articles

The polyurethane polymer according to the disclosure generally can be formed by first reacting the isocyanate, the lignin, and the cyclic alkyl carbonate to form a polyurethane prepolymer reaction product, and then curing the prepolymer reaction product to form the polyurethane polymer, for example after application to one or more substrates to provide a coating thereon or adhesive therebetween. The prepolymer reaction product contains at least some unreacted isocyanate and/or hydroxy groups for eventual further reaction during curing/full crosslinking. The initial, prepolymer reaction can be performed in a suitable reaction solvent or medium, which generally includes the cyclic alkyl carbonate. In some cases, the prepolymer reaction medium can contain water. Preferably, the prepolymer reaction medium is free or substantially free from organic solvents, in particular volatile and/or aprotic organic solvents, for example containing less than 0.1, 0.01, or 0.001 wt. % of such organic solvents, individually or collectively. Examples of such solvents that are generally avoided include acetone, tetrahydrofuran, 2-butanone, other ketones (e.g., methyl n-propyl ketone, methyl isobutyl ketone, methyl ethyl ketone, ethyl n-amyl ketone), esters (e.g., $C_1$-$C_4$ alkyl esters of $C_1$-$C_4$ carboxylic acids, such as methyl, ethyl, n-propyl, butyl esters of acetic acid such as n-butyl acetate, etc., n-butyl propionate, ethyl 3-ethoxy propionate), dimethylformamide, dimethyl carbonate, 1,4 dioxane, dimethylformamide, etc. In some embodiments, a reaction catalyst is added to catalyze the reaction between the isocyanate and the hydroxyl groups of the lignin. Various commercial and laboratory-synthesized catalysts can be used, for example including, but not limited to, complexes and/or salts of tin (e.g., tin(II) 2-ethylhexanoate) or iron, and tertiary amines (e.g., triethylamine), 1,8-Diazabicyclo[5.4.0]undec-7-ene (DBU) and 1,4-Diazabicyclo[2.2.2]octane (DABCO). Suitably, the prepolymerization reaction can be performed without catalyst to limit or avoid agglomeration and control the polymerization, while a suitable catalyst can be used for the curing portion of the polymerization reaction to help ensure a fully cured product. Prepolymerization and curing can be independently performed by heating (e.g., in an oven, with exposure to a heat lamp, etc.) at a temperature at least 40° C., 60° C., 80° C., and/or up to 60° C., 80° C., 100° C., or 120° C. and/or for a time from 10 min or 1 hr to 6 hr, 12 hr, or 24 hr. Lower heating temperature or ambient temperature curing also possible, such as room temperature curing (e.g., 20° C. to 30° C.) for 2 hr-240 hr or 1-3 days (e.g., at least 4, 8, 12, 16, or 24 hr and/or up to 12, 16, 24, 48, 72, 96, 120, or 240 hr), lower heating (e.g., 30° C. or 40° C. to 60° C. for 4 hr-96 hr or 2-4 days or 60° C. to 80° C. for 1 hr-72 hr or 1-3 days).

Reaction to form the prepolymer reaction product generally can be performed at any suitable reaction temperature(s) and time(s), which can be selected such that there is sufficient time to partially (but not completely) react the isocyanate, lignin, and cyclic alkyl carbonate components of the reaction mixture, thus leaving some reactive functional groups and optionally some unreacted cyclic alkyl carbonate for eventual full curing/crosslinking in the final polyurethane polymer. In an embodiment, reaction to form the prepolymer reaction product is performed (i) at temperature from 20° C. or 40° C. to 80° C. or 100° C. and (ii) for a time from 5 min to 300 min. Thus, reaction can be performed with or without heating the reaction mixture. Room-temperature (e.g., 20° C. to 30° C.) reactions are possible with longer reaction times and/or the addition of a catalyst. The initial reaction between the isocyanate and the aliphatic hydroxyl groups of the lignin is generally fast at ambient temperature. Subsequent reaction between the aromatic hydroxyl groups of the lignin and the cyclic alkyl carbonate is slower and preferably involves heating and/or the use of a catalyst.

EXAMPLES

The following examples illustrate the disclosed compositions and methods, but are not intended to limit the scope of any claims thereto.

Example 1—General Prepolymer and Polymer Formulations

Propylene carbonate (PC) was used as an illustrative cyclic alkyl carbonate according to the disclosure, which carbonate can serve as both solvent and reactant in a lignin-based polyurethane (PU) resin. PC can be used as a viscosity-reducer solvent in polyurethane and polyurea prepolymers, and it can be used in cosmetic applications. PC is not considered to be a volatile organic compound (VOC), because it has a very high boiling point (200° C.). According to the NFPA 704 Standard, PC is relatively safe. PC can be used to dissolve lignin, with a simultaneous capability to react with lignin's aromatic hydroxyl groups which are available, to convert them to aliphatic hydroxyl that can make urethane linkages in a PU prepolymer.

Various PU prepolymers and corresponding, crosslinked network PU polymers were formed and evaluated as generally described below.

First, pure methylene diphenyl isocyanate (MDI) was used as a representative isocyanate and was melted at approximately 45-50° C. Then, a solution of lignin dissolved in PC was gradually added to melted MDI. Since the urethane reaction is exothermic, the temperature increased, and a water bath was used to control the reaction temperature of the system. The mixture temperature was kept at 70° C. during the 2 hrs reaction time, to avoid any side reactions such as formation of allophanates. The aliphatic hydroxyl groups in lignin first react with isocyanate, then the aromatic hydroxyl groups of lignin that are less reactive toward isocyanate (due to lower nucleophile properties for resonance of electron in aromatic ring) react with the carbonate groups of PC. In this process, another aliphatic hydroxyl group will be formed that is more reactive than the lignin phenolic hydroxyl groups. In this step, the hydroxyl group in the extended chain (from PC reaction with phenolic OH of lignin) can easily react with another isocyanate group. Therefore, all chemicals that are used in this mixture were chemically bonded together and form a 100% solid mixture. The chemical bond formation between PC and hydroxyl groups of lignin were confirmed using phosphorus nuclear magnetic resonance spectroscopy method ($^{31}$P NMR) data, which shows that the aromatic hydroxyl groups and carboxylic acid content of lignin were decreased from 2.9 mmol/g and 0.42 mmol/g to 1.8 mmol/g and 0.11 mmol/g, respectively.

The free isocyanate (NCO) content of the prepared prepolymers was measured using titration method. The prepolymer was mixed with a specific amount of dibutylamine solution and the mixture was titrated with 1 N hydrochloric acid. The free isocyanate in a prepolymer is typically expressed as % NCO, which corresponds to the weight percent of unreacted isocyanate groups in the material (e.g., grams of unreacted NCO groups per 100 grams of prepolymer). Alternatively or additionally, the free isocyanate in a prepolymer can be expressed on an equivalent weight (e.g., amount of prepolymer based on gram which contains 1 mol unreacted isocyanate), which is related to the weight basis using 42 g/mol for the NCO group. The hydroxyl contents of three lignin samples used are tabulated in Table 1. The ratio of lignin and isocyanate as well as PC can be adjusted, based on both the aliphatic and aromatic OH contents of a particular lignin. Different formulations for different lignin samples were made. For hardwood Kraft lignin and hardwood organosolv lignin, which have very good solubility in PC, no pretreatment was used. Softwood Kraft lignin has lower solubility in PC, however, and a one-step modification was used to improve solubility. Specifically, the mixture of lignin and PC was mixed at room temperature for 5 min and the mixture was heated at 175° C. for 1.5 h. At higher temperature, not only the solubility of lignin in PC is increased but also the reaction between hydroxyl groups of lignin and PC is faster. After 1.5 h, it was observed that most of the lignin (e.g., more than 95 wt. %) was soluble. This preheating process could be performed in a batch reactor process, for example by first mixing the lignin with PC, applying heat, and then adding the isocyanate. After heating, the PC/lignin solution was used for the preparation of prepolymer. Four systems were used to make lignin-based polyurethane adhesive, which include 1) an NCO-terminated 100% solid polyurethane prepolymer which can be mixed with lignin to cure (2K), 2) an OH- (or polyol-) terminated high solid PU prepolymer which can be mixed with isocyanate to cure (2K), 3) a 1K NCO-terminated polyurethane, and 4) a water-based NCO-terminated polyurethane.

TABLE 1

Hydroxyl contents of lignin samples obtained from $^{31}$PNMR analysis

| Source | Isolation | Aliphatic OH (mmol/g) | Total phenolic (mmol/g) | Total OH (mmol/g) | OH value | EW-Total | OH value-aliphatic | EW-Aliphatic |
|---|---|---|---|---|---|---|---|---|
| Hardwood | Organosolv | 1.31 | 2.39 | 4.12 | 231.1 | 242.7 | 73.5 | 763.3 |
| Hardwood | Kraft | 1.19 | 4.16 | 5.97 | 334.9 | 167.5 | 66.7 | 840.3 |
| Softwood | Kraft | 2.38 | 3.01 | 5.77 | 323.7 | 173.3 | 133.5 | 420.2 |

The various lignin samples in Table 1 were used to make corresponding PU prepolymers according to the method described above (i.e., heating at 70° C. for 2 hr). The PU prepolymers and their corresponding components are summarized in Table 2 below.

TABLE 2

Formulations of lignin-based PU prepolymers using lignins from Table 1

| Type of prepolymer | Type of lignin | Lignin (g) | MDI (g) | Propylene Carbonate (g) | NCO content (%) |
|---|---|---|---|---|---|
| NCO-terminated | HW organosolv | 0.8 | 3 | 12 | 6 |
| NCO-terminated | HW organosolv | 0.5 | 3 | 12 | 8 |
| NCO-terminated | HW Kraft | 0.8 | 3 | 12 | 6.5 |
| OH-terminated | HW organosolv | 1 | 0.25 | 12 | — |
| NCO-terminated | SW Kraft | 0.5 | 3 | 12 | 6 |
| NCO-terminated | SW Kraft | 0.3 | 3 | 12 | 9 |
| NCO-terminated | SW Kraft | 0.6 | 3 | 12 + 10 wt % DMSO | 7 |

As shown in Table 2, the examples included an OH-terminated (or polyol-terminated) prepolymer according to the disclosure. An OH-terminated prepolymer increases the storage stability of prepolymer and the final adhesive product. When the amount of hydroxyl groups in lignin is much higher than that in isocyanate, available free OH groups present in the formulation are not reactive with various compounds (unlike isocyanate). So, the free OH groups in the OH-terminated prepolymer will react when an excess amount of isocyanate is added subsequently (e.g., an NCO-terminated prepolymer, isocyanate monomer, or otherwise), and, since they are in liquid phase, the reactivity will increase considerably.

The prepared prepolymers preferably have some excess amount of either isocyanate or hydroxyl groups for subsequent curing, as well as excess unreacted PC that can dissolve, react and cure the resin when it is subsequently mixed with lignin or other crosslinker (e.g., right before application of adhesive, coating, elastomer, or foam formulation to a substrate). Table 3 shows formulations of different NCO-terminated PU prepolymers that can be cured with lignin at different temperatures (e.g., room temperature (about 20-25° C.) and 50° C. as representative temperatures). The same procedure was used to prepare lignin-based prepolymers with toluene diisocyanate (TDI) as the isocyanate monomer, and the corresponding prepolymer showed similar reactivity and properties.

TABLE 3

Formulations and curing conditions for lignin-based PU with an isocyanate index of 100

| Type of lignin | Prepolymer (EW) | Prepolymer (g) | Lignin (g) | Curing Condition |
|---|---|---|---|---|
| HW organosolv | 600.3 | 7.9 | 3 | Room temperature |
| HW organosolv | 600.3 | 2.5 | 3 | 50° C. |
| HW Kraft | 646.5 | 11.6 | 3 | Room temperature |
| HW Kraft | 646.5 | 2.3 | 3 | 50° C. |

The formation of urethane linkages in the prepolymer was confirmed using Fourier transform infrared spectroscopy (FTIR), and gel permeation chromatography (GPC) was used to measure the molecular weights of lignin and the prepared prepolymers. The GPC data showed that the molecular weight increased significantly after prepolymerization, which demonstrated that the urethane linkages were formed by reacting lignin with isocyanate during prepolymer preparation. The disclosed prepolymers can be cured at either room temperature or higher temperature, for example by changing the ratio of raw materials and depending on the desired conditions for a given application.

Figure 3:
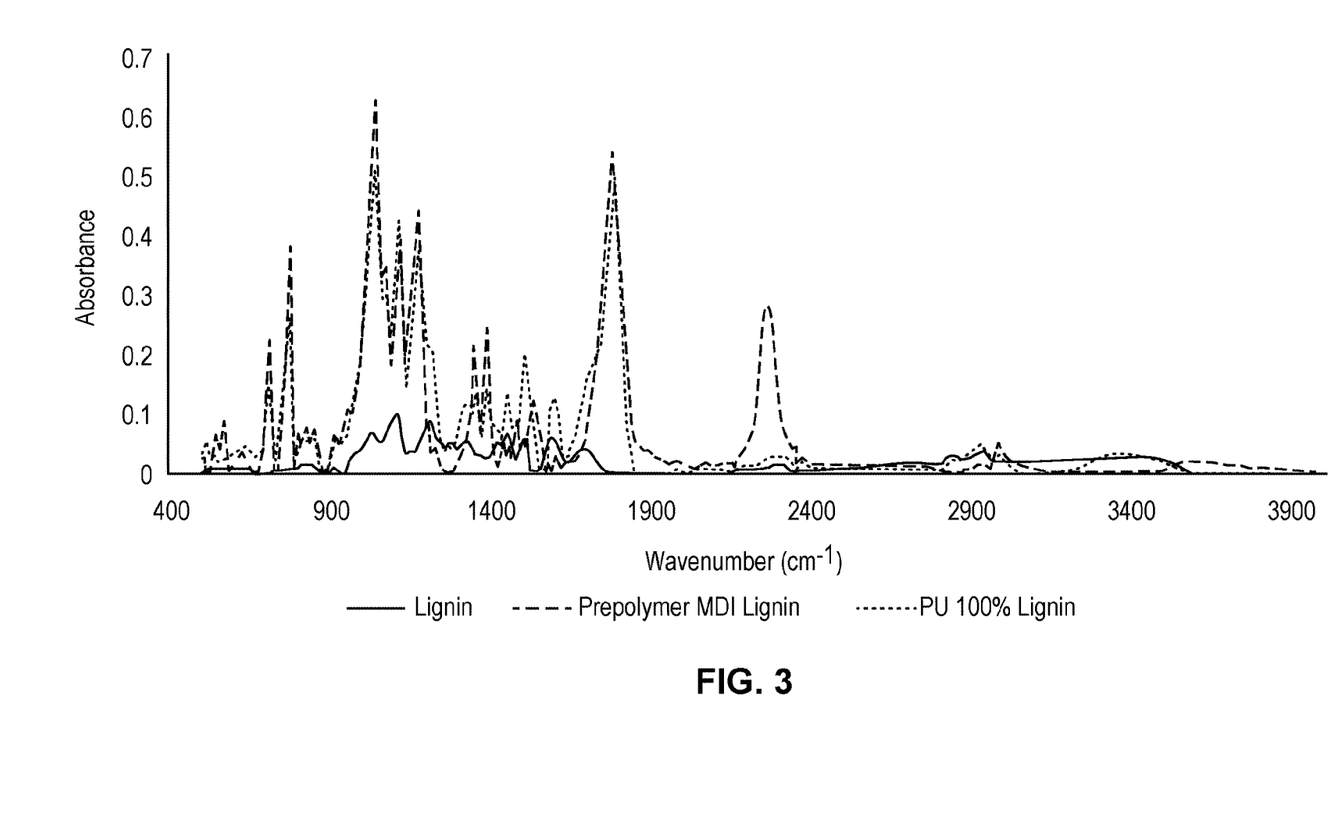
FIG. 3 is a graph of Fourier transform infrared spectroscopy (FTIR) spectra for compositions and components thereof according to the disclosure.

After curing, the developed resin was again characterized by a FTIR spectrometer, which showed no isocyanate peak (2270 $cm^{-1}$), which indicates that all free isocyanate groups in the prepolymer were reacted again with lignin. In addition, after the curing of prepolymer with lignin, a peak appeared around 3400 $cm^{-1}$, which peak is assigned to the N—H bond of urethane linkages in PU. The FTIR spectra of different samples are shown in FIG. 3, including (A) lignin prior to any reaction ("lignin"), (B) PU prepolymer formed from PC, MDI, and lignin ("Prepolymer MDI lignin"), and (C) crosslinked PU polymer cured with lignin ("PU100% lignin). The shelf life of each prepared prepolymer was evaluated by measuring changes in the viscosity of the prepolymer. The viscosity of the prepolymer with 7% free NCO content was 430 cps at room temperature, which remained stable even after couple of months. Prepared PU samples showed very good water resistance properties. For compositions according to the disclosure, all lignin types can be used either from different resources or from different extraction processes. Among commercially available lignin tested in these examples, organosolv and Kraft hardwood lignins performed the best.

Two different types of chain extenders (isophorone diamine and ethylene diamine) were tested to evaluate improvement in the adhesion strength of adhesive. It was shown that ethylene diamine performed better than isophorone diamine. By using only 2 wt % ethylene diamine, dry lap shear strength was increased from 1.57 (±0.1) MPa to 4.46 (±0.4) MPa, while by addition of even 5 wt % isophorone diamine resulted on adhesion strength of 1.75 (±0.1) MPa. The results indicate that diamine chain extenders can be used to improve the dry adhesion strength of a lignin-based PU resin according to the disclosure. More generally, a chain extender can be added when mixing the prepolymer with lignin or other curing agent. Suitable chain extenders include di-functional tri-functional amines or alcohols.

In addition, a waterborne lignin-based PU resin was formulated to evaluate feasibility of using the same method. Since PC is immiscible in water, a dispersion modifier (2,2-Bis hydroxymethyl propanoic acid), was used to facilitate the miscibility of PC in water (using a 20 wt. % PC solution in water) and extra amount of that was neutralized with ethylene triamine. More specifically, a prepolymer was synthesized as described above, and then 5 wt. % of water was added to the prepolymer while it was being stirred at high rpm. After about 2-3 min of stirring, about 80-160 wt. % additional water based on the prepolymer weight was added and mixed for about 30 min. Then the emulsion that is obtained by this process can be converted to a solid phase by evaporation of water. The lap shear test of the waterborne formulation was 4.34 (±0.4) MPa.

Example 2—Adhesive Formulations

Adhesive formulations were formed using the PU prepolymers from Example 1, including NCO-terminated PU prepolymers ("NCO-PU") and/or OH-terminated PU prepolymers ("OH-PU"). Powder lignin was used to cure many of the adhesive formulations using NCO-terminated PU prepolymers. The adhesive formulations are summarized in Table 4 below. The formulations were cured under various temperature conditions and with or without the application of pressure (170 psi), and then the cured adhesives were tested for maximum lap shear strength. The optional inclusion of a chain extender (isophorone diamine (IPDA) or ethylene diamine (EDA)) was also evaluated. Lap shear strength can be suitably determined by applying 0.12 g of adhesive formulation to 6.45 cm$^2$ (1 in$^2$) area on a test substrate. Two test substrates are contacted with their adhesive sides facing each other and cured according to the indicated conditions. The dry lap shear strength of the joined substrates can be determined using ASTM D5868.

TABLE 4

Adhesive formulations tested and maximum lap shear strength

| # | Formulation | % Chain extender | Type of lignin | % NCO | Cure Conditions Temp. (° C.) | Press. (170 psi) | Lap-shear (MPa) Ave. | STD |
|---|---|---|---|---|---|---|---|---|
| 1 | NCO-PU/lignin | 0 | HW organosolv | 6 | RT | none | 0.96 | 0.1 |
| 2 | NCO-PU/lignin | 0 | HW organosolv | 6 | RT | 3.5 h | 1.57 | 0.1 |
| 3 | NCO-PU/lignin | 5% IPDA | HW organosolv | 6 | RT | 3.5 h | 1.75 | 0.1 |
| 4 | NCO-PU/lignin | 0 | HW organosolv | 6 | 70 | 3.5 h | 3.83 | 0.4 |
| 5 | NCO-PU/lignin | 0 | HW organosolv | 6 | 70 | 5 min | 2.39 | 0.1 |
| 6 | NCO-PU/lignin | 0 | HW organosolv | 6 | 130 | 4 min | 3.62 | 0.2 |
| 7 | NCO-PU/lignin | 0 | HW organosolv | 6 | 130 | 3.5 h | 4.07 | 0.2 |
| 8 | NCO-PU/lignin | 0 | HW organosolv | 8 | RT | none | 0.71 | 0.1 |
| 9 | NCO-PU/lignin | 5% IPDA | HW organosolv | 8 | RT | none | 1.21 | 0.1 |
| 10 | NCO-PU/lignin | 0 | HW organosolv | 8 | 70 | 3.5 h | 1.14 | 0.1 |
| 11 | NCO-PU/lignin | 5% IPDA | HW organosolv | 8 | 70 | 3.5 h | 1.19 | 0.2 |
| 12 | NCO-PU/lignin | 0 | HW organosolv | 6 | 70 | 3.5 h | 3.83 | 0.4 |
| 13 | NCO-PU/lignin | 0 | HW organosolv | 8 | 70 | 3.5 h | 2.37 | 0.3 |
| 14 | NCO-PU/lignin | 0 | HW organosolv | 6 | 70 | 5 min | 3.62 | 0.2 |
| 15 | NCO-PU/lignin | 0 | HW organosolv | 8 | 70 | 5 min | 2.38 | 0.4 |
| 16 | NCO-PU/lignin | 0 | HW organosolv | 8 | 70 | 4 min | 1.66 | 0.2 |
| 17 | NCO-PU/lignin | 0 | HW organosolv | 6 | 70 | 4 min | 2.39 | 0.2 |
| 18 | NCO-PU/lignin | 5% IPDA | HW organosolv | 8 | 70 | 4 min | 2.89 | 0.2 |
| 19 | NCO-PU/lignin | 0 | HW organosolv | 6 | 170 | 4 min | 4.07 | 0.2 |
| 20 | NCO-PU/lignin | 0 | HW organosolv | 8 | 170 | 4 min | 2.46 | 0.2 |
| 21 | NCO-PU/lignin | 5% IPDA | HW organosolv | 6 | 170 | 4 min | 1.86 | 0.3 |
| 22 | NCO-PU/OH-PU | 2% EDA | HW organosolv | 6 | RT | 3.5 h | 4.88 | 0.4 |
| 23 | NCO-PU/OH-PU | 2% EDA | HW organosolv | 6 | RT | 3.5 h | 4.46 | 0.3 |
| 24 | NCO-PU (1K) | 2% EDA | HW organosolv | 6 | RT | 3.5 h | 4.73 | 0.3 |
| 25 | NCO-PU (1K) | 0 | HW organosolv | 6 | RT | 3.5 h | 4.11 | 0.3 |
| 26 | Water NCO-PU | 2% EDA | HW organosolv | 6 | RT | 3.5 h | 4.34 | 0.4 |
| 27 | NCO-PU/lignin | 0 | HW kraft | 6.5 | RT | none | 0.95 | 0.1 |
| 28 | NCO-PU/lignin | 0 | HW kraft | 6.5 | RT | 3.5 h | 1.42 | 0.1 |
| 29 | NCO-PU/lignin | 5% IPDA | HW kraft | 6.5 | RT | 3.5 h | 1.17 | 0.1 |
| 30 | NCO-PU/lignin | 0 | HW kraft | 6.5 | 170 | 3.5 h | 1.42 | 0.1 |
| 31 | NCO-PU/lignin | 0 | HW kraft | 8 | 170 | 3.5 h | 1.18 | 0.1 |

TABLE 4-continued

Adhesive formulations tested and maximum lap shear strength

| | | | | | Cure Conditions | | Lap-shear | |
| | | % Chain | | % | Temp. | Press. | (MPa) | |
| # | Formulation | extender | Type of lignin | NCO | (° C.) | (170 psi) | Ave. | STD |
|---|---|---|---|---|---|---|---|---|
| 32 | NCO-PU/lignin | 0 | SW kraft + 10% DMSO | 8 | RT | 3.5 h | 4.01 | 0.4 |
| 33 | NCO-PU/lignin | 0 | SW kraft + 10% DMSO | 8 | RT | 3.5 h | 5.47 | 0.3 |
| 34 | NCO-PU (1K) | 0 | SW kraft | 6 | RT | 3.5 h | 4.10 | 0.4 |

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A prepolymer mixture comprising:
   a cyclic alkyl carbonate medium; and
   a polyurethane prepolymer in the cyclic alkyl carbonate medium, wherein:
   the polyurethane prepolymer comprises a reaction product between an isocyanate, a lignin comprising aliphatic hydroxyl groups and aromatic hydroxyl groups, and a cyclic alkyl carbonate;
   the reaction product comprises at least one of free isocyanate groups and free hydroxyl groups;
   the reaction product comprises urethane linking groups between residues of the lignin aliphatic hydroxyl groups and the isocyanate;
   the reaction product comprises ester linking groups between residues of the lignin aromatic hydroxyl groups and a ring-opened cyclic alkyl carbonate;
   the reaction product has an isocyanate content in a range from 1 wt. % to 30 wt. % based on weight of isocyanate relative to weight of prepolymer;
   the reaction product has a lignin content in a range from 1 wt. % to 50 wt. % based on weight of lignin relative to weight of prepolymer;
   the reaction product has a cyclic alkyl carbonate content in a range from 30 wt. % to 80 wt. % based on weight of cyclic alkyl carbonate relative to weight of prepolymer; and
   the reaction product is present in the prepolymer mixture in an amount ranging from 10 wt. % to 50 wt. % based on the combined weight of the cyclic alkyl carbonate medium and the reaction product.

2. The prepolymer mixture of claim 1, wherein the isocyanate comprises a diisocyanate.

3. The prepolymer mixture of claim 1, wherein the isocyanate is selected from the group consisting of 4,4'-diphenylmethane diisocyanate (MDI), polymeric methylene diphenyl diisocyanate (pMDI), one or more isomers of tolylene diisocyanate (TDI), and combinations thereof.

4. The prepolymer mixture of claim 1, wherein the lignin is derived from a biomass selected from the group consisting of hardwoods, softwoods, grasses, and combinations thereof.

5. The prepolymer mixture of claim 1, wherein the lignin is isolated from an extraction process selected from the group consisting of Kraft extraction, soda extraction, organosolv extraction, enzymatic hydrolysis extraction, ionic liquid, extraction, and combinations thereof.

6. The prepolymer mixture of claim 1, wherein the lignin, prior to incorporation into the reaction product, has at least one of the following properties:
   a molecular weight in a range of 1000 to 20000;
   a polydispersity in a range of 1.5 to 5;
   an aliphatic hydroxyl content in a range of 1 to 4 mmol/g;
   a phenol hydroxyl content in a range of 2 to 5 mmol/g; and
   a total hydroxyl content in a range of 3 to 8 mmol/g.

7. The prepolymer mixture of claim 1, wherein the cyclic alkyl carbonate has an alkyl group containing from 2 to 20 carbon atoms.

8. The prepolymer mixture of claim 1, wherein the cyclic alkyl carbonate has a structure according to Formula I:

wherein:
n is 1 to 10;
i is each of 1 to n; and
$R_i$, $R'_i$, $R_{n+1}$, and $R'_{n+1}$ are independently selected from the group consisting of H and linear or branched, substituted or unsubstituted $C_1$-$C_{10}$ alkyl groups.

9. The prepolymer mixture of claim 8, wherein:
n is 1;
$R_1$, $R'_1$, and $R'_2$ are H; and
$R_2$ is $CH_3$.

10. The prepolymer mixture of claim 8, wherein:
n is 1; and
$R_1$, $R'_1$, $R_2$, and $R'_2$ are H.

11. The prepolymer mixture of claim 8, wherein:
n is 2; and
$R_1$, $R'_1$, $R_2$, $R'_2$, $R_3$, and $R'_3$ are H.

12. The prepolymer mixture of claim 1, wherein the reaction product comprises free isocyanate groups.

13. The prepolymer mixture of claim 12, wherein the reaction product has a free isocyanate group content in a range from 1 wt. % to 30 wt. % based on weight of free isocyanate groups relative to weight of prepolymer.

14. The prepolymer mixture of claim 1, wherein the reaction product comprises free hydroxyl groups.

15. The prepolymer mixture of claim 14, wherein the reaction product has a free hydroxyl group content in a range from 1 wt. % to 40 wt. % based on weight of free hydroxyl groups relative to weight of prepolymer.

16. The prepolymer mixture of claim 1, wherein the reaction product comprises free isocyanate groups and free hydroxyl groups.

17. The prepolymer mixture of claim 16, wherein:
the reaction product has a free isocyanate group content in a range from 1 wt. % to 30 wt. % based on weight of free isocyanate groups relative to weight of prepolymer; and
the reaction product has a free hydroxyl group content in a range from 1 wt. % to 40 wt. % based on weight of free hydroxyl groups relative to weight of prepolymer.

18. The prepolymer mixture of claim 1, wherein the reaction product is free from polyol residues other than the lignin and the ring-opened cyclic alkyl carbonate.

19. The prepolymer mixture of claim 1, wherein:
the reaction product has an isocyanate content in a range from 1 wt. % to 30 wt. % based on weight of isocyanate relative to weight of prepolymer;
the reaction product has a lignin content in a range from 1 wt. % to 30 wt. % based on weight of lignin relative to weight of prepolymer; and
the reaction product has a cyclic alkyl carbonate content in a range from 10 wt. % to 80 wt. % based on weight of cyclic alkyl carbonate relative to weight of prepolymer.

20. The prepolymer mixture of claim 1, wherein the reaction product further comprises urethane linking groups between residues of the ring-opened cyclic alkyl carbonate and the isocyanate.

21. The prepolymer mixture of claim 1, wherein the reaction product is present in the prepolymer mixture in an amount ranging from 10 wt. % to 50 wt. % based on the combined weight of the cyclic alkyl carbonate medium and the reaction product.

22. The prepolymer mixture of claim 1, wherein the reaction product is in solution in the cyclic alkyl carbonate medium.

23. The prepolymer mixture of claim 1, wherein:
the prepolymer mixture further comprises water;
the reaction product is in solution in the cyclic alkyl carbonate medium; and
the cyclic alkyl carbonate medium with the reaction product dissolved therein is dispersed throughout the water.

24. The prepolymer mixture of claim 1, wherein the prepolymer mixture further comprises at least one of an adhesion promoter, a curing catalyst, and a chain extender.

25. A polyurethane polymer comprising:
a networked, crosslinked polymerization product of the prepolymer mixture of claim 1.

26. The polyurethane polymer of claim 25, wherein:
the reaction product comprises free isocyanate groups; and
the polyurethane polymer is a networked, crosslinked polymerization product between the reaction product and further lignin.

27. The polyurethane polymer of claim 25, wherein:
the reaction product comprises hydroxyl groups; and
the polyurethane polymer is a networked, crosslinked polymerization product between the reaction product and further isocyanate.

28. The polyurethane polymer of claim 25, wherein:
the reaction product comprises free isocyanate groups and free hydroxyl groups; and
the polyurethane polymer is a networked, crosslinked polymerization product between the reaction product itself.

29. The polyurethane polymer of claim 25, further comprising one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

30. An article comprising:
(a) a substrate; and
(b) a polyurethane polymer according to claim 25 coated on a surface of the substrate.

31. The article of claim 30, wherein the substrate is selected from the group of metal, plastics, a different thermoset material, glass, wood, fabric, composites, and ceramics.

32. The article of claim 30, wherein the polyurethane polymer has a thickness ranging from 0.01 µm to 500 µm.

33. The article of claim 30, further comprising an additional substrate, wherein:
the polyurethane polymer is also coated on a surface of the additional substrate, and the polyurethane polymer joins the substrate and the additional substrate together.

* * * * *